(12) United States Patent
Wulff (10) Patent No.: US 9,387,656 B2
(45) Date of Patent: Jul. 12, 2016

(54) METHOD AND APPARATUS FOR CONNECTING COMPONENT PARTS OF A FUEL CELL

(71) Applicant: Daimler AG, Stuttgart (DE)

(72) Inventor: Christian Wulff, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 30 days.

(21) Appl. No.: 14/415,826

(22) PCT Filed: Jul. 11, 2013

(86) PCT No.: PCT/EP2013/002071
§ 371 (c)(1),
(2) Date: Jan. 20, 2015

(87) PCT Pub. No.: WO2014/015955
PCT Pub. Date: Jan. 30, 2014

(65) Prior Publication Data
US 2015/0210052 A1    Jul. 30, 2015

(30) Foreign Application Priority Data
Jul. 26, 2012   (DE) .......................... 10 2012 014 757

(51) Int. Cl.
*B32B 37/12*   (2006.01)
*B29C 65/48*   (2006.01)
(Continued)

(52) U.S. Cl.
CPC ......... *B32B 37/1284* (2013.01); *B29C 65/4835* (2013.01); *B32B 37/0046* (2013.01);
(Continued)

(58) Field of Classification Search
CPC ............ B29C 65/4835; B29C 65/4845; B29C 66/9161; B29C 65/1412; B29C 65/1496; B29C 66/1122; B29C 66/24221; B29C 66/24244; B29C 66/43; B29C 66/71; B29C 66/712; B29C 66/727; B29C 65/1406; B29C 66/3472; B29C 66/81268; C09J 5/00; C09J 2203/33; C09J 2205/31; H01M 8/0271; H01M 8/0273; H01M 8/0284; H01M 8/0286; H01M 8/0297; H01M 8/02; Y02E 60/50; B32B 37/0046; B32B 2457/18; B32B 2310/0831; B32B 2310/0825; B32B 38/0008; B32B 37/18; B32B 37/1292; B32B 37/1284; B32B 2037/1253; B29L 2031/3468; B29L 2012/00; B29K 2023/12
USPC .................. 429/460, 468, 469, 508, 509, 510
See application file for complete search history.

(56) References Cited

U.S. PATENT DOCUMENTS

| 2009/0004541 A1 | 1/2009 | Jacobine et al. |
| 2009/0162734 A1* | 6/2009 | Yandrasits .......... H01M 8/0271 429/514 |

(Continued)

FOREIGN PATENT DOCUMENTS

| DE | 3314896 A1 | 10/1983 |
| DE | 102007005589 A1 | 8/2008 |

(Continued)

OTHER PUBLICATIONS

English language translation of Japanese Office Action dated Dec. 1, 2015, in Japanese Application No. 2015-523444.

(Continued)

*Primary Examiner* — Jacob T Minskey
*Assistant Examiner* — Vishal I Patel
(74) *Attorney, Agent, or Firm* — Patent Central LLC; Stephan A. Pendorf (57) ABSTRACT

A method for connecting component parts (1, 2, 3) of a fuel cell. A photochemically curable adhesive (5) is applied in liquid form at least regionally to at least one component part (1, 2, 3) of the fuel cell, is photochemically pre-cured, is brought into contact with at least one further component part (1, 2, 3) of the fuel cell and is cured. The photochemically curable adhesive (5) is photochemically pre-cured to differing degrees in at least two component part regions (B1, B2) of the component part (1, 2, 3). Furthermore, an apparatus for connecting component parts (1, 2, 3) of a fuel cell.

11 Claims, 2 Drawing Sheets

(51) Int. Cl.

| | | |
|---|---|---|
| *H01M 8/02* | (2016.01) | |
| *C09J 5/00* | (2006.01) | |
| *B32B 37/00* | (2006.01) | |
| *B32B 37/18* | (2006.01) | |
| *B32B 38/00* | (2006.01) | |
| B29L 31/34 | (2006.01) | |
| B29C 65/14 | (2006.01) | |
| B29C 65/00 | (2006.01) | |
| B29L 12/00 | (2006.01) | |

(52) U.S. Cl.
 CPC ............. *B32B37/1292* (2013.01); *B32B 37/18* (2013.01); *B32B 38/0008* (2013.01); *C09J 5/00* (2013.01); *H01M 8/02* (2013.01); *H01M 8/0271* (2013.01); *H01M 8/0273* (2013.01); *H01M 8/0284* (2013.01); *H01M 8/0286* (2013.01); *H01M 8/0297* (2013.01); *B29C 65/1406* (2013.01); *B29C 65/1412* (2013.01); *B29C 65/1496* (2013.01); *B29C 65/4845* (2013.01); *B29C 66/1122* (2013.01); *B29C 66/24221* (2013.01); *B29C 66/24244* (2013.01); *B29C 66/3472* (2013.01); *B29C 66/43* (2013.01); *B29C 66/71* (2013.01); *B29C 66/712* (2013.01); *B29C 66/727* (2013.01); *B29C 66/81268* (2013.01); *B29C 66/9161* (2013.01); *B29K 2995/0027* (2013.01); *B29L 2012/00* (2013.01); *B29L 2031/3468* (2013.01); *B32B 2037/1253* (2013.01); *B32B 2310/0825* (2013.01); *B32B 2310/0831* (2013.01); *B32B 2457/18* (2013.01); *C09J 2203/33* (2013.01); *C09J 2205/31* (2013.01); *Y02E 60/50* (2013.01)

(56) References Cited

U.S. PATENT DOCUMENTS

| | | | |
|---|---|---|---|
| 2010/0151231 A1* | 6/2010 | Matsuo | .................. B29C 59/14 428/336 |
| 2010/0216048 A1 | 8/2010 | Braeuninger et al. | |

FOREIGN PATENT DOCUMENTS

| | | |
|---|---|---|
| DE | 19934995 A1 | 10/2010 |
| DE | 102009039029 A1 | 3/2011 |
| GB | 2119810 A | 11/1983 |
| JP | 2006202535 A | 8/2006 |
| JP | 2007157387 A | 6/2007 |
| JP | 2009026636 A | 2/2009 |
| WO | 2008040682 A1 | 4/2008 |

OTHER PUBLICATIONS

International Search Report in International Application No. PCT/EP2013/002071 dated Sep. 30, 2013.

* cited by examiner

METHOD AND APPARATUS FOR CONNECTING COMPONENT PARTS OF A FUEL CELL

The invention relates to a method for connecting components of a fuel cell according to the features of the preamble of Claim 1, and a device for connecting components of a fuel cell according to the features of the preamble of Claim 7.

A method for manufacturing a membrane-electrode assembly of a fuel cell is known from the prior art, as described in US 2009/0162734 A1. A light-curing resin is applied to a catalyst-coated membrane (CCM) and pre-cured by irradiation with light. A gas diffusion layer is applied to the membrane in order to form the membrane-electrode assembly, and is brought into contact with the pre-cured resin. The resin is subsequently completely cured in a thermal curing process.

A method for manufacturing a membrane-electrode unit is described in WO 2008/040682 A1. The membrane-electrode unit contains an anode catalyst layer, a polymer electrolyte membrane, and a cathode catalyst layer. In the method, a first border made of a UV-curable material is applied to the polymer electrolyte membrane, an inner area of the polymer electrolyte membrane remaining free of the UV-curable material. A catalyst layer is applied which covers the inner area of the polymer electrolyte membrane and overlaps with the first border. A second border made of the UV-curable material is applied to the first border, the second border surrounding the catalyst layer. A third border made of the UV-curable material is applied to the second border, the third border overlapping with the catalyst layer. The first, second, and third borders are irradiated with UV radiation.

The object of the invention is to provide an improved method and an improved device for connecting components of a fuel cell.

The object is achieved according to the invention by a method for connecting components of a fuel cell, having the features of Claim 1, and a device for connecting components of a fuel cell, having the features of Claim 7.

Advantageous embodiments of the invention are the subject matter of the subclaims.

In a method for connecting components of a fuel cell, a photochemically curable adhesive in liquid form is applied, at least in areas, to at least one component of the fuel cell, photochemically pre-cured, brought into contact with at least one further component of the fuel cell, and cured.

According to the invention, the adhesive is photochemically pre-cured to differing degrees in at least two component areas of the component. This pre-curing is also referred to as pre-crosslinking of the adhesive.

In this way, rheological properties of the adhesive may be set in a targeted manner, and thus adapted to particular requirements in the various component areas of the component, so that optimal adhesive bonding of the components of the fuel cell to be adhesively bonded to one another may be ensured. The viscosity of the adhesive is increased by a more intense pre-curing of the adhesive, thus preventing running of the adhesive on the component. Due to a lesser degree of pre-curing, after the pre-curing the adhesive has a correspondingly lower viscosity, i.e., higher fluidity, so that it is able to spread better, and to better penetrate, for example, into rough and/or porous structures, so that, for example, roughness may be evened out by the adhesive. The adhesive may thus also be used as a seal, for example, thus achieving a secure sealing effect due to the optimal, uniform spreading, in particular in the component area in which the adhesive still has a low viscosity after the pre-curing.

In comparison to film adhesives known from the prior art which are heat-curing and joined flatly, due to use of the liquid, photochemically curable adhesive there is no waste, and therefore no increased material usage. In addition, on account of the photochemically curable adhesive, curing times are greatly reduced, and the photochemically curable adhesive, in contrast to the film adhesive, may cure without contact. Furthermore, cost reductions are achievable using the photochemically curable adhesive.

In one advantageous embodiment, the photochemically curable adhesive is applied to the at least one component only in the component areas in which the adhesive is also subsequently photochemically pre-cured. This means that all of the photochemically curable adhesive applied to the at least one component is photochemically pre-cured, being photochemically pre-cured to differing degrees in different component areas of the at least one component of the fuel cell. Uncontrolled running of adhesive which is not pre-cured, and thus highly fluid, on the at least one component of the fuel cell is thus avoided; i.e., wetting, for example, of areas of the component with the adhesive which are to kept away from the adhesive is avoided.

The photochemically curable adhesive is preferably applied, at least in areas, to a first component of the fuel cell which is designed as a first frame element of a membrane-electrode assembly, and to a third component of the fuel cell which is designed as a second frame element of the membrane-electrode assembly, and after the photochemical pre-curing of the photochemically curable adhesive, a second component of the fuel cell which is designed as a catalyst-coated membrane of the membrane-electrode assembly is positioned between the first component and the third component, the three components are joined together, and the photochemically curable adhesive is cured. During the joining of the three components, the adhesive is also brought into contact with the second component, so that the first component is also adhesively bonded to the third component, and the second component is adhesively bonded to the two other components.

Prior to the joining of the three components, the adhesive is pre-cured more intensely, for example, in inflow and/or outflow areas of the membrane-electrode assembly, since a high level of geometric precision is necessary at these locations due to the fact that these are free-standing structures in the joined connection of the membrane-electrode assembly. The adhesive acquires necessary strength as a result of more intense pre-curing of the adhesive, thus preventing running of the adhesive in these component areas.

In contained areas of the catalyst-coated membrane between the two frame elements, which in each case are designed, for example, as a polymer film made of polypropylene, for example, due to the less intense pre-curing the adhesive remains fluid enough to ensure optimal wetting of a porous surface of the catalyst-coated membrane at this location, and to form an inner seal between the catalyst-coated membrane and the two frame elements which are adhesively bonded together. The catalyst-coated membrane is designed as a plastic film, for example, which is coated with carbon, for example in the form of powdered carbon. The catalyst-coated membrane is porous and has a large surface area. In particular due to this porosity, a relatively fluid adhesive is necessary in order to fill the pores in edge areas of the catalyst-coated membrane which are to be adhesively bonded to the two frame elements, and thus to ensure optimal adhesive bonding to the two frame elements and a sealing effect of the adhesive.

The photochemically curable adhesive is advantageously photochemically pre-cured by ultraviolet radiation and/or infrared radiation. For this purpose, the adhesive is irradiated with ultraviolet radiation and/or infrared radiation. This is carried out, for example, by means of one, or advantageously a plurality of, radiation sources designed as light-emitting diodes, i.e., UV light- or infrared light-emitting diodes, or having a tubular design, i.e., by means of tubular UV radiators or infrared radiators. When tubular UV radiators are used, these may be designed, for example, as low-pressure radiators, medium-pressure radiators, or high-pressure radiators. Flat irradiation of the component coated with the adhesive is achieved using a plurality of such radiation sources. As the result of curing by ultraviolet radiation and/or infrared radiation, in particular curing of the adhesive solely by visible light, and thus, uncontrolled curing of the adhesive, is prevented. Naturally, for this purpose photochemically curable adhesive is to be used which is to be correspondingly cured by ultraviolet radiation and/or infrared radiation. Within the scope of the present invention, however, the use of UV radiation is preferred.

In one advantageous embodiment, the photochemically curable adhesive is photochemically cured; i.e., the curing of the photochemically curable adhesive is likewise carried out photochemically after the components to be adhesively bonded have been joined together and brought into contact with the photochemically pre-cured adhesive. In this way, not only the pre-curing of the adhesive, but also the complete curing of the adhesive is possible in a contactless manner. This means that contacting of the component, or the components to be joined together, with a heating element and increased heat input are not necessary. Damage to the components due to excessive heat input is thus avoided. This curing of the adhesive is also advantageously carried out by ultraviolet radiation and/or infrared radiation. For this purpose, the same irradiation system may be used as for the pre-curing of the adhesive.

Alternatively, however, it would also be possible to carry out the curing of the adhesive in some other way. Accordingly, the photochemically curable adhesive would have to be an adhesive which is photochemically curable, and curable in some other way, for example by heat input via at least one heating unit, i.e., an adhesive which is at least also photochemically curable. In this embodiment of the method, the at least also photochemically curable adhesive would then be photochemically pre-cured, and cured in some other way, for example by heating.

The component which is coated with the photochemically curable adhesive is advantageously masked prior to the photochemical pre-curing of the adhesive in such a way that for the photochemical pre-curing of the adhesive, the at least two component areas are irradiated at different irradiation intensities. The pre-curing of the adhesive to differing degrees is achieved in this way. Either the component area in which the adhesive is to be pre-cured more intensely is not masked, or the masking in this area is designed to be more permeable to the particular radiation used, advantageously the ultraviolet radiation and/or the infrared radiation, than in the area in which the adhesive is to be pre-cured less intensely. The masking may be designed in such a way that it absorbs and/or reflects the radiation correspondingly more intensely the lower the degree to which the adhesive is to be pre-cured. The more radiation that is absorbed and/or reflected by the masking, the less radiation that passes through the masking, which is neither reflected nor absorbed by the masking and which therefore does not reach the adhesive in order to photochemically pre-cure it.

This type of masking may also be used for curing the photochemically curable adhesive after the components are joined together, in order to achieve here as well differing degrees of irradiation, and thus a different curing characteristic of the adhesive, in different component areas. If the curing is to take place analogously as for the pre-curing, the same masking as already used for the pre-curing may be re-used.

In one advantageous embodiment, the photochemically curable adhesive is applied to the at least one component of the fuel cell by means of screen printing. Highly precise application of the adhesive is made possible in this way. In particular, selective application of the adhesive is thus made possible; i.e., the adhesive may be applied to the component, for example, only in areas and not over the entire surface, and also to differing degrees in different areas. Alternatively, the adhesive may, for example, be sprayed or misted on, spread on, or applied by means of other known printing techniques or adhesive application techniques.

A device according to the invention for connecting components of a fuel cell, by means of which the method for connecting components of a fuel cell may be carried out, includes an applicator unit for applying, at least in areas, a photochemically curable adhesive to at least one component of the fuel cell, an irradiation system for photochemical pre-curing the photochemically curable adhesive, and masking for masking, at least in areas, the component of the fuel cell which is coated with the photochemically curable adhesive, in such a way that for the photochemical pre-curing of the photochemically curable adhesive, at least two component areas may be irradiated at different irradiation intensities. The photochemical curing of the photochemically curable adhesive is also possible after the components are connected, i.e., after the components to be joined together are contacted with the adhesive, by means of this device, in particular by means of the irradiation system of the device.

The device allows the described method to be carried out, and thus achieves the above-described advantages resulting from the method. In this way, rheological properties of the adhesive may be set in a targeted manner, and thus adapted to particular requirements in the various component areas of the component, so that optimal adhesive bonding of the components of the fuel cell to be adhesively bonded to one another may be ensured. The viscosity of the adhesive is to be increased by a more intense pre-curing of the adhesive, thus preventing running of the adhesive on the component. Due to a lesser degree of pre-curing, after the pre-curing the adhesive has a correspondingly lower viscosity, i.e., higher fluidity, so that it is able to spread better, and to better penetrate, for example, into rough and/or porous structures, so that, for example, roughness may be evened out by the adhesive. The adhesive may thus also be used as a seal, for example, thus achieving a secure sealing effect due to the optimal, uniform spreading, in particular in the component area in which the adhesive still has a low viscosity after the pre-curing.

The pre-curing of the adhesive to differing degrees is achieved by the masking. Either the component area in which the adhesive is to be pre-cured more intensely is not to be masked, or the masking in this area is designed to be more permeable to the radiation than in the area in which the adhesive is to be pre-cured less intensely. The masking may be designed in such a way that it absorbs and/or reflects the radiation correspondingly more intensely the lower the degree to which the adhesive is to be pre-cured.

The irradiation system preferably has at least one radiation source designed as a light-emitting diode, and/or at least one tubular radiation source. The irradiation system advantageously has a plurality of such radiation sources. As a result of these radiation sources, in particular flat irradiation of the component which is coated with adhesive is achieved.

The at least one radiation source is advantageously designed as a radiation source which emits ultraviolet radiation and/or as a radiation source which emits infrared radiation. This allows the photochemical curing of the photochemically curable adhesive by ultraviolet radiation and/or infrared radiation. In particular curing of the adhesive solely by visible light, and thus, uncontrolled curing of the adhesive, is thus prevented.

The applicator unit is preferably designed as a screen printer. Highly precise application of the photochemically curable adhesive is thus made possible. In particular, selective application of the adhesive is made possible; i.e., the adhesive is to be applied to the component, for example, only in areas and not over the entire surface, and also to differing degrees in different areas.

Exemplary embodiments of the invention are explained in greater detail with reference to the drawings, which show the following.

Mutually corresponding parts are provided with the same reference numerals in all the figures.

Figure 1:
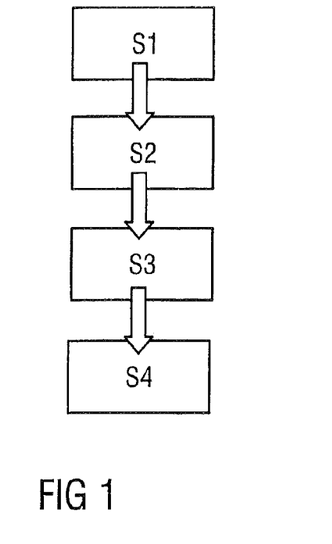
FIG. 1 schematically shows a flow chart of a method for connecting components of a fuel cell, FIG. 2 schematically shows a component of a fuel cell which is wetted with a photochemically curable adhesive, in the top view, FIG. 3 schematically shows a sectional illustration of a component of a fuel cell according to section line III-III in FIG. 2, masking, and an irradiation system, and FIG. 4 schematically shows a sectional illustration of a membrane-electrode assembly, masking, and an irradiation system.
Figure 2:
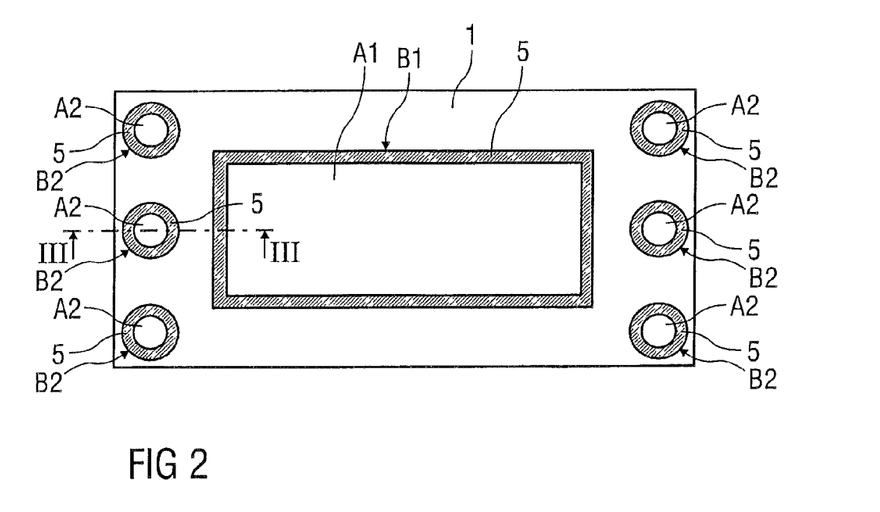
Figure 3:
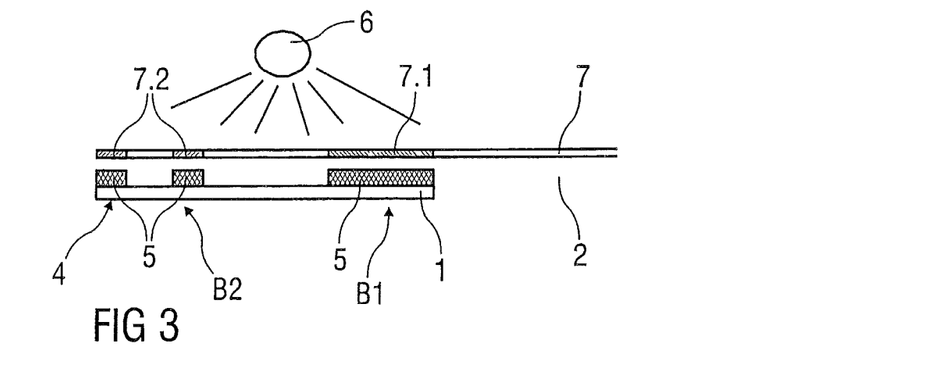
Figure 4:
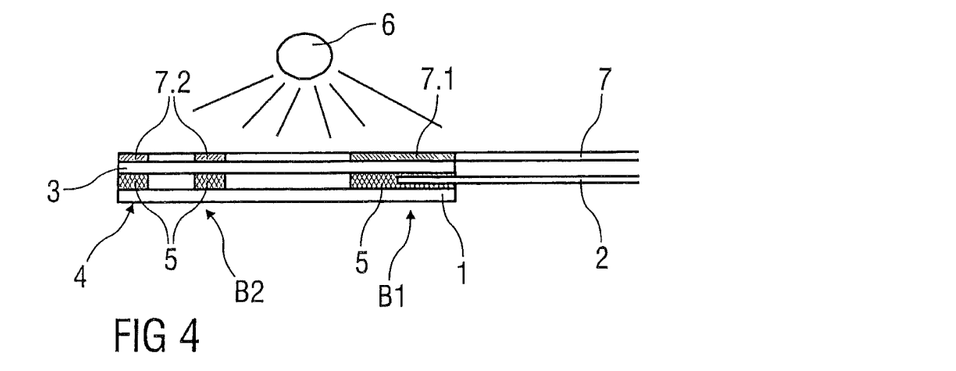

FIG. 1 schematically shows a flow chart of a method for connecting components 1, 2, 3 of a fuel cell, not illustrated in greater detail here. FIGS. 2 through 4 schematically illustrate the method sequence based on an example, wherein a membrane-electrode assembly 4 of the fuel cell is provided using the method. For this purpose, three components 1, 2, 3 are to be connected to one another: a first component 1 which is designed as a first frame element of the membrane-electrode assembly 4, a second component 2 which is designed as a catalyst-coated membrane of the membrane-electrode assembly 4, and a third component 3 which is designed as a second frame element of the membrane-electrode assembly 4.

To connect these components 1, 2, 3 to one another, in a first method step S1 a photochemically curable adhesive 5 is applied in liquid form in areas to the first component 1 and the third component 3, i.e., to the first and the second frame elements. The adhesive 5 is subsequently photochemically pre-cured in a second method step S2. The three components 1, 2, 3 are positioned with respect to one another in a predefined manner in a third method step S3 so that the second component 2, i.e., the catalyst-coated membrane, is also brought into contact with the adhesive 5 that is applied to the first component 1 and the third component 3. The adhesive 5 is subsequently cured in a fourth method step S4.

The two frame elements of the membrane-electrode assembly 4 of the fuel cell, i.e., the first and the third component 1, 3, respectively, are each designed, for example, as a polymer film made of polypropylene, for example. These frame elements each have a large-surface first cutout A1 in a central area, as illustrated in FIG. 2. Only the first component 1, i.e., the first frame element, is illustrated in FIG. 2. However, the third component 3, i.e., the second frame element, has a corresponding design. Therefore, the following statements analogously apply to both frame elements, i.e., to the first component 1 illustrated in FIG. 2 and to the third component 3 having a corresponding design.

The second component 2, i.e., the catalyst-coated membrane, is to be arranged In the area of the first cutout A1 in the first and third component 1, 3, respectively. In this way, the catalyst-coated membrane is to be bordered by the frame elements, i.e., surrounded at the edges. The catalyst-coated membrane is designed, for example, as a plastic film that is coated with carbon, for example in the form of powdered carbon. The catalyst-coated membrane is porous and has a large surface area.

The frame elements, i.e., the first and third component 1, 3, respectively, also have second cutouts A2 in the transverse edge areas which are used as inflow and/or outflow areas of the membrane-electrode assembly 4, i.e., as so-called ports. Reaction gases are supplied to an active area of the fuel cell, and reaction products are discharged therefrom, through these second cutouts A2. In addition, a temperature control medium may also be passed through a corresponding temperature control medium area of the fuel cell via one or more of these second cutouts A2, i.e., may be introduced into and discharged from this temperature control medium area.

It is known from the prior art to connect these frame elements and the catalyst-coated membrane by means of film adhesives which are heat-curing and joined flatly. However, a large amount of waste occurs with these film adhesives, so that a correspondingly high material usage is necessary in conjunction with correspondingly high costs. In addition, the film adhesive requires long curing times, and the curing must be carried out by setting up heating elements, i.e., by contacting these heating elements with the frame elements and/or the catalyst-coated membrane. This may result in damage due to excessive heat input.

Furthermore, it is known from the prior art to use liquid adhesive and to photochemically pre-cure same. However, this pre-curing takes place via uniform full-surface irradiation, so that the adhesive is uniformly pre-cured in all areas. After the parts to be connected are joined, the complete curing of the adhesive then takes place once again by thermal means, with the described disadvantages.

In the method illustrated here, in the first method step S1 the photochemically curable adhesive 5 in liquid form is applied in a targeted manner to predefined component areas B1, B2 of the first component 1 and of the third component 3, i.e., the frame elements. This may take place simultaneously or in succession for the two components 1, 3. In this regard, "applied in a targeted manner" means that the particular component area B1, B2, in which the adhesive 5 is to be applied, as well as a particular quantity of the adhesive 5 to be applied, are predefined. This targeted application is to be carried out, for example, using a screen printing process. For this purpose, an applicator unit, not illustrated in greater detail here, of a device for carrying out the method is designed as a screen printer. If the adhesive 5 is to be applied simultaneously to the first and the third component 1, 3, respectively, an applicator unit having an appropriately large design is necessary, or two applicator units are necessary.

In this example, the adhesive 5, as illustrated in FIG. 2, is applied to the first component 1 and the third component 3 in edge areas which surround the cutouts A1, A2, i.e., applied to a first component area B1 which surrounds the first cutout A1 of the first and third component 1, 3, respectively, and to second component areas B2 which in each case surround a second cutout A2 of the first and third component 1, 3, respectively. As mentioned above, for reasons of clarity only the first component 1 is illustrated in FIG. 2. However, the adhesive is applied to the third component 3 in the same way as described. The adhesive 5 is applied only to one surface side of the respective component 1, 3. The two components 1, 3 are then to be adhesively bonded to one another, and in each case to the second component 2, via this surface side.

Immediately after the application, the adhesive 5 has the same consistency in all component areas B1, B2 in which it has been applied to the first component 1 and the third component 3; i.e., it is liquid and therefore has a very low viscosity. The adhesive 5 is photochemically curable; i.e., irradiation with light at one or more predefined wavelengths initiates a chemical reaction in the adhesive 5 which results in successive curing or crosslinking of the adhesive 5, so that the viscosity of the adhesive increases with continued irradiation until the adhesive 5 is completely cured. The speed of this photochemical process is a function of the irradiation intensity which acts on the adhesive 5; i.e., the greater the irradiation intensity, the more quickly the adhesive 5 cures. The adhesive 5 may possibly be initially activated prior to the start of curing by the irradiation, and then increasingly cured, depending on the particular type of adhesive used.

To avoid uncontrolled curing of the adhesive 5, adhesive 5 is advantageously used which does not cure, or at least cures only very slightly, under visible light, but which instead is to be photochemically cured by ultraviolet radiation and/or by infrared radiation. In this way, the manufacture of the membrane-electrode assembly 4, with the exception of the curing of the adhesive 5, may be carried out under normal ambient light conditions without the risk of uncontrolled curing of the adhesive 5, since the curing of the adhesive 5 is to be carried out by the controlled use of ultraviolet radiation and/or infrared radiation.

After the adhesive 5 has been applied to the first component 1 and the third component 3, i.e., to the two frame elements, in the first method step S1, the adhesive 5 is photochemically pre-cured in the second method step S2. However, this takes place not via full-surface, uniform irradiation as known from the prior art, but, rather, in a targeted manner. This means that the adhesive 5 is pre-cured or pre-crosslinked to differing degrees in the different component areas B1, B2 of the first component 1 and the third component 3. This is to be achieved by radiation which acts on the adhesive 5 with a different irradiation intensity in these different component areas B1, B2.

For this purpose, as illustrated in FIG. 3, masking 7 is situated above the respective component 1, 3, i.e., between a side of the respective component 1, 3 that is coated with the adhesive 5 and an irradiation system 6 of the device for =Tying out the method. For reasons of clarity, only a sectional illustration of the first component 1 corresponding to section line III-III in FIG. 2 is illustrated in FIG. 3. Correspondingly, of the masking 7 essentially only the area covering the illustrated area of the first component 1 is shown, in cross section.

This masking 7 is used to mask the respective component 1, 3 in areas. The masking 7, which is likewise a component of the device for carrying out the method, has a first masking area 7.1 and second masking areas 7.2, the first masking area 7.1 and the second masking areas 7.2 being designed in such a way that they allow differing degrees of the radiation emitted by the irradiation system 6 to pass through to the adhesive 5 on the respective component 1, 3.

This means that the first masking area 7.1 and the second masking areas 7.2 are designed, for example, with differing degrees of absorption and/or reflection for the radiation emitted by the irradiation system 6. The more intensely the masking areas 7.1, 7.2 absorb and/or reflect the radiation emitted by the irradiation system 6, the less radiation that passes through the masking 7 and reaches the adhesive 5 beneath the respective masking area 7.1, 7.2 in order to photochemically pre-cure it; i.e., the lower the irradiation intensity that acts on the adhesive 5 in the component area B1, B2 situated beneath the respective masking area 7.1, 7.2. The areas of the masking 7 situated between the masking areas 7.1, 7.2 are insignificant, since no adhesive 5 is present thereunder; i.e., these areas may have a design which is completely transparent or partially or completely opaque.

Also in FIG. 3, for reasons of clarity this is illustrated only with reference to the first component 1, i.e., the first frame element, but is carried out analogously for the third component 3, i.e., the second frame element. This may take place simultaneously or in succession. In succession, this may be carried out using the same masking 7 and the same irradiation system 6 of the device; for simultaneous pre-curing of the adhesive 5, two such maskings 7 and either two irradiation systems 6 or one sufficiently large irradiation system 6 would correspondingly be necessary, so that both masked frame elements may be irradiated at the same time.

In the example illustrated here, the first masking area 7.1 is more reflective and/or absorptive for the radiation emitted by the irradiation system 6 than the second masking areas 7.2; i.e., the second masking areas 7.2 are more transparent to the radiation emitted by the irradiation system 6 than the first masking area 7.1. The radiation emitted by the irradiation system 6 may thus penetrate the second masking areas 7.2 to a greater degree than the first masking area 7.1. The masking 7, as illustrated in FIG. 3, is positioned between the irradiation system 6 and the side of the first component 1 or the third component 3 which is coated with the adhesive 5 in such a way that the first masking area 7.1 masks the first component area B1 from the radiation emitted by the irradiation system 6, and the second masking areas 7.2 mask the second component areas B2 from the radiation emitted by the irradiation system 6.

The first component 1 and the third component 3 are subsequently irradiated with ultraviolet radiation and/or infrared radiation by means of the irradiation system 6. Irradiation with ultraviolet radiation and infrared radiation may take place, for example, in succession or multiple times in alternation, beginning with the ultraviolet radiation or with the infrared radiation. A particular duration of irradiation is to be specified, for example, as a function of the particular adhesive 5 used and/or the power of radiation sources used in the irradiation system 6.

These radiation sources are designed, for example, as light-emitting diodes or as tubular radiation sources which emit ultraviolet radiation and/or infrared radiation; i.e., the radiation sources are to be selected corresponding to the radiation that is required for the photochemical curing of the adhesive 5. Light-emitting diodes (LED) are designed, for example, as diodes which emit UV light and/or infrared light. Tubular radiation sources, in particular for UV radiation, are designed, for example, as so-called low-pressure mercury vapor tubes, medium-pressure mercury vapor tubes, high-pressure mercury vapor tubes, or ultrahigh-pressure mercury vapor tubes. The radiation sources are preferably arranged in the irradiation system 6 in a flat shape so that large-surface, uniform irradiation is made possible. The masking 7 is thus irradiated uniformly over the entire surface. The differing irradiation intensities for the adhesive 5 in the different component areas B1, B2 of the first component 1 and of the third component 3 are then achieved via the masking 7.

Since the first masking area 7.1, which the radiation emitted by the irradiation system 6 passes through with less intensity, covers the first component area B1, and the second masking areas 7.2, which the radiation emitted by the irradiation system 6 passes through with greater intensity, cover the second component areas B2, the irradiation intensity acting on the second component areas B2 and the adhesive 5 applied there is greater than the irradiation intensity acting on the first component area B1 and the adhesive 5 applied there. For irradiation using only one irradiation system 6, differing degrees of pre-curing of the adhesive 5 in the different component areas B1, B2 are achieved for all component areas B1, B2 of the first component 1 and of the third component 3, respectively, coated with adhesive 5. In this example, the adhesive 5 in the first component area B1 is pre-cured to a lesser degree due to the lower irradiation intensity, and in the second component areas B2 is pre-cured to a higher degree due to the greater irradiation intensity. As a result, after the pre-curing the adhesive 5 has a lower viscosity in the first component area B1 than in the second component areas B2; i.e., the adhesive 5 has a higher fluidity, and thus is more liquid, in the first component area B1 than in the second component areas B2. In this way, rheology of the adhesive 5 is adapted to particular specific requirements and material properties.

In the third method step S3 the second component 2, i.e., the catalyst-coated membrane, is arranged between the first component 1 which is coated with adhesive 5 in the described manner, and the third component 3 which is coated with adhesive 5 in the described manner, i.e., between the frame elements, in order to adhesively bond the components 1, 2, 3 to one another in the fourth method step S4 by curing of the adhesive 5, as illustrated in FIG. 4. Also in FIG. 4, similarly as for FIG. 3, for reasons of clarity a cross-sectional illustration of the components 1, 2, 3 is shown only in areas.

After this arrangement of the components 1, 2, 3 in the described manner, the two frame elements, i.e., the first component 1 and the third component 3, rest directly one on top of the other in the second component areas B2, and are adhesively bonded together by means of the adhesive 5. Since the adhesive 5 has a higher viscosity in these second component areas B2, running or deliquescence of the adhesive 5 here is avoided. This allows a high level of geometric precision and contour accuracy of the adhesive arrangement on the first component 1 and the third component 3, which is necessary in the second component areas B2 due to the fact that the inflow and/or outflow areas provided here are free-standing structures in the joined connection of the membrane-electrode assembly 4.

For attaching the second component 2, an edge area of this second component 2, i.e., the catalyst-coated membrane, is situated in the first component area B1 in such a way that this edge area may be adhesively bonded to the first component 1 and the third component 3 by means of the adhesive 5. In this first component area B1 to which the edge area of the catalyst-coated membrane is to be adhesively bonded, after the adhesive bonding of the membrane-electrode assembly 4, in addition to the connecting function of the components 1, 2, 3 the adhesive 5 also has a sealing function; i.e., the adhesive 5 should form a seal here which seals off the catalyst-coated membrane from the frame formed from the two frame elements, thus preventing the reaction gases from escaping laterally between the two frame elements, i.e., between the first component 1 and the third component 3.

To achieve this, the adhesive 5 must penetrate into the edge area of the second component 2, i.e., the porous catalyst-coated membrane, and completely enclose the edge area at the sides and also sufficiently wet a top side and bottom side of the catalyst-coated membrane in this edge area, so that sealing adhesive bonding of the second component 2 to the first component 1 and to the third component 3 may be ensured. In addition, to achieve the required sealing effect, the adhesive 5 must level out the uneven, rough, and porous surface of the edge area of the catalyst-coated membrane so that no openings remain between the components 1, 2, 3 in this area. This is made possible and ensured by the lower viscosity of the adhesive 5 in the first component area B1 of the first component 1 and of the third component 3.

As mentioned above, although only the first component 1 is illustrated in FIGS. 2 and 3, in the described embodiment of the method the first component 1 and the third component 3, i.e., the two frame elements, are coated with the adhesive 5 in the same way, and the adhesive is pre-cured in the same way. However, in other embodiments of the method which are not illustrated here, it is also possible to apply and/or pre-cure the adhesive 5 in a different way on the two frame elements, i.e., on the first component 1 and the third component 3. For example, in such a different embodiment of the method, the adhesive may be applied to the third component 3 only in the first component area B1 in order to ensure proper adhesive bonding of the third component 3 to the second component 2. There is then no such application of adhesive in the second component area B2 of the third component 3, since the adhesive 5 already applied to the first component 1 in this second component area B2 is sufficient to securely adhesively bond the first component 1 and the third component 3, i.e., the two frame elements, to one another.

For completely adhesively bonding the components 1, 2, 3 to one another in order to form the membrane-electrode assembly 4, the components 1, 2, 3 situated on one another in the described manner and illustrated in FIG. 4 are re-irradiated by means of the irradiation system 6 of the device for carrying out the method in order to thus completely cure the adhesive 5. Alternatively, this could be carried out using another irradiation system of the device, not illustrated here, in the event that, for example, different radiation sources are necessary for curing the adhesive 5 than for the pre-curing. For example, the pre-curing could be carried out by ultraviolet radiation, and the curing could be carried out by infrared radiation, or vice versa. For irradiation with ultraviolet radiation and infrared radiation for the curing, here as well this may take place analogously as for the pre-curing, for example in succession or multiple times in alternation, beginning with the ultraviolet radiation or with the infrared radiation. Here as well, a particular duration of irradiation is to be specified, for example, as a function of the particular adhesive 5 used and/or the power of radiation sources used in the irradiation system 6.

To allow the photochemical curing of the adhesive 5, at least the first component 1 and/or the third component 3 must be sufficiently transparent to the radiation emitted by the irradiation system 6, i.e., for use of ultraviolet radiation and/or infrared radiation, must be transparent or at least sufficiently translucent to the particular radiation so the radiation may reach the adhesive 5 in order to cure it. It may be particularly preferred that the first component 1 as well as the third component 3 have a design that is sufficiently transparent to the radiation emitted by the irradiation system 6.

In the example illustrated in FIG. 4, in which the same irradiation system 6 is used for curing the adhesive 5 as that already used for pre-curing the adhesive 5, only one side of the illustrated component arrangement is irradiated here in order to connect the components 1, 2, 3 to one another by the curing of the adhesive 5, and thus to complete the membrane-electrode assembly 4. However, to ensure optimal curing of the adhesive 5 in all areas of the component arrangement, it is also possible to carry out the irradiation from both sides, either in succession by repositioning the component arrangement and/or the irradiation system 6, or simultaneously.

For simultaneous irradiation, however, it would be necessary for the irradiation system 6 to have appropriate radiation sources on both sides of the component arrangement, i.e., on the side on which the first component 1 is situated as well as on the side on which the second component 2 is situated, or for the device for carrying out the method to have two irradiation systems 6, between which the components 1, 2, 3 arranged on one another in the described manner and which form the component arrangement illustrated in FIG. 4, are to be arranged for the curing of the adhesive 5.

In the example illustrated in FIG. 4, the masking 7 is once again arranged on the third component 3, i.e., between the third component 3 and the irradiation system 6. In the illustrated example, this is the same masking 7 that has already been used on the first component 1 and the third component 3 for pre-curing the adhesive 5. This masking 7 thus has the same effect; i.e., the first masking area 7.1, which the radiation emitted by the irradiation system 6 passes through with less intensity, now simultaneously masks the first component area B1 of the first component 1 and of the third component 3 from the radiation emitted by the irradiation system 6, and the second masking areas 7.2, which the radiation emitted by the irradiation system 6 passes through with greater intensity, now simultaneously mask the second component areas B2 of the first component 1 and of the third component 3 from the radiation emitted by the irradiation system 6.

The irradiation intensity acting on the second component areas B2 and the adhesive 5 applied there is thus greater than the irradiation intensity acting on the first component area B1 and the adhesive 5 applied there. For irradiation using only one irradiation system 6, differing degrees of curing of the adhesive 5 in the different component areas B1, B2 are thus achieved for all component areas B1, B2 coated with adhesive 5. In this example, the adhesive 5 in the first component area B1 is cured to a lesser degree due to the lower irradiation intensity, and in the second component areas B2 is cured to a higher degree due to the greater irradiation intensity. As a result, for example in the first component area B1, i.e., in the connecting area of the second component 2 to the first component 1 and to the third component 3, excessive curing and thus, for example, embrittlement of the adhesive 5 may be avoided, so that the adhesive 5 also has a predefined elasticity, for example, in order to ensure its sealing function in this area.

Alternatively, in another embodiment of the method, additional masking having a different design, for example, may be used, which then has different masking areas having respectively different transparency to the radiation emitted by the irradiation system 6, so that, for example, the adhesive 5 is then irradiated with a greater irradiation intensity in the first component area B1 than in the second component areas B2 in order to once again compensate for the preceding different pre-curing of the adhesive 5, and thus ensure uniform curing of the adhesive 5; i.e., the adhesive 5 in the first component area B1, which has been pre-cured to a lesser degree, would then be cured to a greater degree in the fourth method step S4, and the adhesive 5 in the second component areas B2, which has been pre-cured to a greater degree, would then be cured to a lesser degree in the fourth method step S4, so that the final consistency of the adhesive 5 after the curing is the same in all component areas B1, B2.

In the example illustrated in FIG. 4, the component arrangement, as described above, is irradiated from only one side by means of the irradiation system 6, so that the masking 7 is also arranged only on this side. Alternatively, if the component arrangement is to be irradiated from both sides, as likewise described above, and if this type of masking 7 is to be used for the two irradiations, in each case such masking 7 would correspondingly be necessary on both sides of the component arrangement, or the two sides of the component arrangement are irradiated in succession, so that the one masking 7 would be sufficient. In that case, the masking would be arranged only between the particular side of the component arrangement to be irradiated and of the irradiation system 6.

The invention claimed is:

1. A method for connecting components (1, 2, 3) of a fuel cell, comprising:
   (a) applying a photochemically curable adhesive (5) in liquid form, at least in areas, to at least one component (1, 2, 3) of the fuel cell,
   (b) photochemically pre-curing the adhesive,
   (c) bringing the at least one component (1, 2, 3) into contact with at least one further component (1, 2, 3) of the fuel cell, and
   (d) curing,
   wherein in step (b) the photochemically curable adhesive (5) is photochemically pre-cured to differing degrees in at least two component areas (B1, B2) of the component (1, 2, 3).

2. The method according to claim 1, wherein the photochemically curable adhesive (5) is applied, at least in areas, to a first component (1) of the fuel cell which is a first frame element of a membrane-electrode assembly (4), and to a third component (3) of the fuel cell which is a second frame element of the membrane-electrode assembly (4), and after the photochemical pre-curing of the photochemically curable adhesive (5), a second component (2) of the fuel cell which is a catalyst-coated membrane of the membrane-electrode assembly (4) is positioned between the first component (1) and the third component (3), the three components (1, 2, 3) are joined together, and the photochemically curable adhesive (5) is cured.

3. The method according to claim 1, wherein the photochemically curable adhesive (5) is photochemically pre-cured by ultraviolet radiation and/or by infrared radiation.

4. The method according to claim 1, wherein the photochemically curable adhesive (5) is photochemically cured.

5. The method according to claim 1, wherein the component (1, 2, 3) which is coated with the photochemically curable adhesive (5) is masked prior to the photochemical pre-curing of the adhesive (5) in such a way that for the photochemical pre-curing of the photochemically curable adhesive (5), the at least two component areas (B1, B2) are irradiated at different irradiation intensities.

6. The method according to claim 1, wherein the photochemically curable adhesive (5) is applied to the at least one component (1, 2, 3) by screen printing.

7. A device for connecting components (1, 2, 3) of a fuel cell for carrying out a method according to claim 1, including
   an applicator unit for applying, at least in areas, a photochemically curable adhesive (5) in liquid form to at least one component (1, 2, 3) of the fuel cell,
   an irradiation system (6) for photochemical pre-curing the photochemically curable adhesive (5), and
   masking (7) for masking, at least in areas, the component (1, 2, 3) of the fuel cell which is coated with the photochemically curable adhesive (5) in such a way that for the photochemical pre-curing of the photochemically curable adhesive (5), at least two component areas (B1, B2) may be irradiated at different irradiation intensities.

8. The device according to claim 7, wherein the irradiation system (6) has at least one radiation source which is a light-emitting diode and/or has at least one tubular radiation source.

9. The device according to claim 8, wherein the at least one radiation source is a radiation source which emits ultraviolet radiation and/or as a radiation source which emits infrared radiation.

10. The device according to claim 7, wherein the applicator unit is a screen printer.

11. The method according to claim 1, wherein the photochemically curable adhesive (5) is photochemically cured by ultraviolet radiation and/or by infrared radiation.

* * * * *